(12) United States Patent
Lin et al.

(10) Patent No.: US 12,198,447 B1
(45) Date of Patent: Jan. 14, 2025

(54) METHOD AND APPARATUS FOR 4D ROAD SCENE ANNOTATION BASED ON TIME SERIES DATA, AND ELECTRONIC DEVICE

(71) Applicant: Molar Intelligence (Hangzhou) Co., Ltd., Hangzhou (CN)

(72) Inventors: Qunshu Lin, Hangzhou (CN); Minghao Liu, Hangzhou (CN); Shigang Qi, Hangzhou (CN); Xinjun Wu, Hangzhou (CN); Yi Yang, Hangzhou (CN); Chao Zhang, Hangzhou (CN); Zijian Zhao, Hangzhou (CN); Haolong Peng, Hangzhou (CN); Qijun Shao, Hangzhou (CN)

(73) Assignee: Molar Intelligence (Hangzhou) Co., Ltd., Hangzhou (CN)

( * ) Notice: Subject to any disclaimer, the term of this patent is extended or adjusted under 35 U.S.C. 154(b) by 0 days.

(21) Appl. No.: 18/415,681

(22) Filed: Jan. 18, 2024

(30) Foreign Application Priority Data

Nov. 13, 2023 (CN) .......................... 202311497951.X

(51) Int. Cl.
| | |
|---|---|
| *G06V 20/58* | (2022.01) |
| *G06T 7/13* | (2017.01) |
| *G06T 7/246* | (2017.01) |
| *G06T 7/80* | (2017.01) |
| *G06T 17/00* | (2006.01) |

(Continued)

(52) U.S. Cl.
CPC .............. *G06V 20/588* (2022.01); *G06T 7/13* (2017.01); *G06T 7/246* (2017.01); *G06T 7/80* (2017.01); *G06T 17/00* (2013.01); *G06V 10/25* (2022.01); *G06V 10/462* (2022.01); *G06V 20/70* (2022.01); *G06V 2201/07* (2022.01)

(58) Field of Classification Search
None
See application file for complete search history.

(56) References Cited

U.S. PATENT DOCUMENTS 9,070,216 B2 * 6/2015 Golparvar-Fard .... G06T 19/006
9,165,383 B1 * 10/2015 Mendez-Rodriguez ....................
G06T 11/001

(Continued)

FOREIGN PATENT DOCUMENTS

| CN | 115932885 A | * | 4/2023 | ............. G06V 10/22 |
| WO | WO-2014188225 A1 | * | 11/2014 | ......... G06K 9/00201 |

(Continued)

*Primary Examiner* — Reza Aghevli
(74) *Attorney, Agent, or Firm* — True Shepherd LLC; Andrew C. Cheng

(57) ABSTRACT

A method and an apparatus for 4D road scene annotation based on time series data includes: obtaining point cloud data and multi-view 2D image data of a same road scene at a same time series, as well as a rotation matrix R and a translation vector t obtained through sensors; merging all the point cloud data into a combined point cloud using the rotation matrix R and the translation vector t; performing dynamic and static object annotation and lane line annotation on the combined point cloud in the 4D road scene; and mapping annotation information in the 4D road scene to all the 2D image data at the time series based on camera parameter information, to obtain annotation information on 2D images. The method fully utilizes time series information, avoiding the loss of important information.

8 Claims, 7 Drawing Sheets

(51) Int. Cl.
    *G06V 10/25*     (2022.01)
    *G06V 10/46*     (2022.01)
    *G06V 20/56*     (2022.01)
    *G06V 20/70*     (2022.01)

(56) References Cited

U.S. PATENT DOCUMENTS

| | | | |
|---|---|---|---|
| 10,352,693 B2 * | 7/2019 | Abovitz | G06F 3/04883 |
| 11,216,663 B1 * | 1/2022 | Ettinger | G05D 1/0016 |
| 11,818,455 B2 * | 11/2023 | Malia | A63F 13/327 |
| 2013/0155058 A1 * | 6/2013 | Golparvar-Fard | G06Q 10/06311 |
| | | | 345/419 |
| 2018/0349522 A1 * | 12/2018 | Aphek | G06F 30/13 |
| 2019/0325089 A1 * | 10/2019 | Golparvar-Fard | G06T 19/003 |
| 2022/0130145 A1 * | 4/2022 | Connary | G06T 15/20 |
| 2022/0153310 A1 * | 5/2022 | Yang | G05D 1/0221 |
| 2024/0037976 A1 * | 2/2024 | Zhang | G06T 7/60 |
| 2024/0126934 A1 * | 4/2024 | Han | G06Q 10/06 |

FOREIGN PATENT DOCUMENTS

| | | | | |
|---|---|---|---|---|
| WO | WO-2018111920 A1 * | 6/2018 | | B25J 9/1697 |
| WO | WO-2022224638 A1 * | 10/2022 | | G06V 10/22 |

* cited by examiner

METHOD AND APPARATUS FOR 4D ROAD SCENE ANNOTATION BASED ON TIME SERIES DATA, AND ELECTRONIC DEVICE

CROSS-REFERENCE TO RELATED APPLICATIONS

This application claims priority to Chinese Patent Application No. 202311497951.X with a filing date of Nov. 13, 2023. The content of the aforementioned application, including any intervening amendments thereto, is incorporated herein by reference.

TECHNICAL FIELD

The present disclosure relates to the technical field of data annotation, and in particular, to a method and an apparatus for four-dimensional (4D) road scene annotation based on time series data, and an electronic device.

BACKGROUND

Data annotation is a process of labeling material content recognizable by computer vision or natural language processing (NLP). Thanks to data annotation, artificial intelligence (AI) or machine learning models can interpret data in high-quality images, videos, and text. Data annotation enables machine learning projects such as autonomous vehicles to successfully reach their destinations. 4D road scenes introduce the concept of time into three-dimensional (3D) space. The annotation that integrates 4D into 3D space and even two-dimensional (2D) space is a brand new scenario.

Currently, the most fundamental annotation software such as LabelMe and LabelImg requires users to upload data to the annotation software after data collection, and after data in the annotated format is outputted, further modifications are needed based on the training situation. Faced with data related to time series, users are still constrained to annotate one image at a time. A large amount of time series information cannot be fully utilized, resulting in significant time wastage during the annotation process.

Summary of Present Invention

An objective of the present disclosure is to provide a method and an apparatus for 4D road scene annotation based on time series data, and an electronic device, to address the issues of low efficiency in manual annotation and ineffective utilization of time series information.

According to a first aspect of the embodiments of the present disclosure, a method for 4D road scene annotation based on time series data is provided, including:

obtaining point cloud data and multi-view 2D image data of a same road scene at a same time series, as well as a rotation matrix R and a translation vector t obtained through sensors;

merging all the point cloud data into a combined point cloud using the rotation matrix R and the translation vector t, to complete construction of a 4D road scene;

performing dynamic and static object annotation and lane line annotation on the combined point cloud in the 4D road scene, where the dynamic and static object annotation includes detecting objects in the 4D road scene using a 3D object detector to obtain a plurality of detection boxes, and optimizing generation of the detection boxes using bidirectional multi-object tracking; and the lane line annotation includes extracting ground information in the 4D road scene through normal vectors, extracting lane line point sets, and fitting lane line curves; and mapping annotation information in the 4D road scene to all the 2D image data at the time series based on camera parameter information, to obtain annotation information on 2D images.

According to a second aspect of the embodiments of the present disclosure, an apparatus for 4D road scene construction and pre-annotation based on time series data is provided, including:

an obtaining module configured to obtain point cloud data and multi-view 2D image data of a same road scene at a same time series, as well as a rotation matrix R and a translation vector t obtained through sensors;

a merging module configured to merge all the point cloud data into a combined point cloud using the rotation matrix R and the translation vector t, to complete construction of a 4D road scene;

an annotation module configured to perform dynamic and static object annotation and lane line annotation on the combined point cloud in the 4D road scene, where the dynamic and static object annotation includes detecting objects in the 4D road scene using a 3D object detector to obtain a plurality of detection boxes, and optimizing generation of the detection boxes using bidirectional multi-object tracking; and the lane line annotation includes extracting ground information in the 4D road scene through normal vectors, extracting lane line point sets, and fitting lane line curves; and a mapping module configured to map annotation information in the 4D road scene to all the 2D image data at the time series based on camera parameter information, to obtain annotation information on 2D images.

According to a third aspect of the embodiments of the present disclosure, an electronic device is provided, including:

one or more processors; and
a memory, used for storing one or more programs; wherein When the one or more programs are executed by the one or more processors, the one or more processors are enabled to implement the method as described in the first aspect.

According to a fourth aspect of the embodiments of the present disclosure, a computer-readable storage medium storing a computer instruction is provided, where the instruction implements steps of the method as described in the first aspect when executed by a processor.

Compared with the prior art, the embodiments of the present disclosure have at least the following beneficial effects:

The present disclosure excels in annotating a series of data related to time series, fully utilizing time series information. Annotation of time series data in the constructed 4D road scene allows users to obtain more informative representations, avoiding the loss of important information. Annotation results in the 4D road scene can also be reversely applied as annotation results of each frame or each image in the temporal space, effectively reducing the time consumption and greatly improving the efficiency of the annotation. The present disclosure solves the problems of low efficiency in manual annotation and ineffective utilization of time series information.

BRIEF DESCRIPTION OF THE DRAWINGS

The accompanying drawings herein are incorporated into the specification and constitute a part of the specification, illustrate embodiments that conform to the present disclosure, and are used together with the specification to describe the principles of the present disclosure.

DETAILED DESCRIPTION OF THE EMBODIMENTS

The specific implementations of the present disclosure are described in detail below with reference to the accompanying drawings. It should be understood that the specific implementations described herein are merely intended to illustrate and interpret the present disclosure, rather than to limit the present disclosure.

Figure 1:
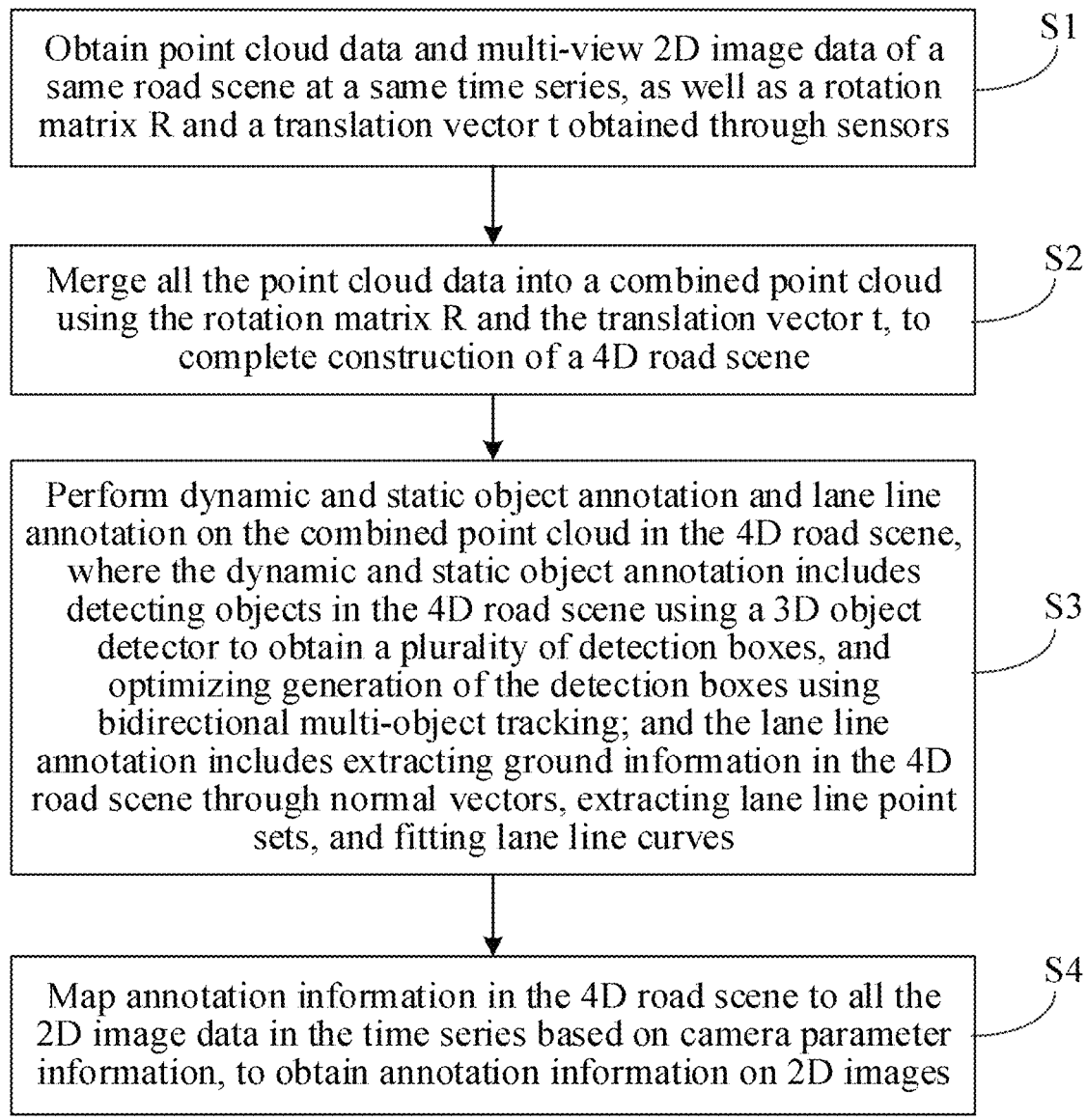
FIG. 1 is a flowchart of a method for 4D road scene annotation based on time series data according to an exemplary embodiment.

FIG. 1 is a flowchart of a method for 4D road scene annotation based on time series data according to an exemplary embodiment. Referring to FIG. 1, the method for 4D road scene annotation based on time series data provided by the embodiments of the present disclosure includes the following steps.

In S1, point cloud data and multi-view 2D image data of a same road scene at a same time series, as well as a rotation matrix R and a translation vector t obtained through sensors are obtained.

Specifically, there are two methods for obtaining the point cloud data and the multi-view 2D image data of the same road scene at the same time series:

(1) In the same road scene at the same time series, multi-view 2D image data captured by a camera and point cloud data captured by a radar are obtained.

Specifically, "the same road scene at the same time series" means that continuous observation or data collection is carried out within the same specific road environment over the same period of time (such as 10 seconds, 30 seconds, or one minute). Multiple frames of images and point cloud data continuously observed or collected form time series information at the same time series, for subsequent 4D scene construction.

Obtaining multi-view 2D image data captured by a camera means obtaining two-dimensional plane visual information captured by a camera from different angles. This method provides comprehensive visual information about the surrounding environment but is limited in judging distances and object volumes due to the lack of height information.

Obtaining point cloud data captured by a radar involves emitting laser beams and receiving signals reflected back to construct a three-dimensional model of the surroundings. This method provides more accurate distance information and relative positional relationships but has weaker detailing capabilities due to the influence of beam density distribution.

Therefore, these two methods have their own advantages and disadvantages, and are often combined to obtain richer and more comprehensive information. In autonomous vehicles, cameras and radar are often used together to achieve optimal road recognition results.

(2) In the same road scene at the same time series, multi-view 2D image data captured by a camera is obtained. 3D information is deduced from the image data of different angels to obtain the point cloud data.

In one embodiment, the process of deducing 3D information from the image data of different angles to obtain point cloud data may include the following steps:

In A1, feature points of the image data are extracted using Scale Invariant Feature Transform (SIFT) descriptors with scale and rotation invariance.

Specifically, the present disclosure employs SIFT descriptors with scale and rotation invariance, which are known for high robustness and suitable for extracting various image feature point information related to scale transformations and rotation angles. For example, in 4*4 grid histograms around a feature point, each histogram contains gradients in 8 bins, resulting in a 4*4*8=128-dimensional feature vector.

In A2, matching calculations are performed between feature points of the image data pair-wise to obtain a rotation matrix R' and a translation vector t'.

Specifically, once feature points of each image are extracted, feature point matching needs to be performed between images pairwise, and a random sample consensus (RANSAC) algorithm is used for filtering to eliminate noise. F(I) is used to represent feature points around image I. For each image pair I and J, considering each feature $f_d \in F(I)$, $f_d \in F(J)$, a nearest feature vector $f_n \in F(J)$ is found:

$$f_n = \mathrm{argmin} \|f_d - f'_d\|_2$$

To obtain the rotation matrix R' and translation vector t' of the relative transformation between images, singular value decomposition (SVD), that is, SVD decomposition is performed on an essential matrix:

$$E = K_2^T F K_1 = USV^T$$

$K_1$ and $K_2$ represent camera parameters, and a constant matrix W is defined as follows:

$$W = \begin{bmatrix} 0 & -1 & 0 \\ 1 & 0 & 0 \\ 0 & 0 & 1 \end{bmatrix}$$

Finally, analytical expressions for R' and t' are obtained as follows:

$$t'_1 = UWSV^T$$

$$t'_2 = -t_1$$

$$R'_1 = UWV^T$$

$$R'_2 = UW^TV^T$$

There are a total of 4 sets of possible solutions: $(t'_1, R'_1)$, $(t'_1, R'_2)$, $(t'_2, R'_1)$, and $(t'_2, R'_2)$. Among these 4 sets of solutions, only one set satisfies that all projection points are at positive depth in both cameras. Therefore, by substituting the matching points, coordinates can be calculated, and the correct set of R' and t' can be selected.

In A3, according to the rotation matrix R', translation vector t', and camera intrinsic parameters, sparse point cloud structures of objects are reconstructed. Each sparse point cloud structure is transformed into a common reference for point cloud fusion, to obtain the point cloud data.

Specifically, based on R' and f calculated in step A2, combined with the camera intrinsic parameters, the sparse point cloud structures of the objects can be reconstructed. The point clouds can be fused after being transformed into a common reference. To reduce errors introduced during point cloud fusion, a Bundle Adjustment (BA) optimization algorithm is adopted to further reduce errors.

Assuming that the first image has m feature points and the second image has n feature points, after matching, all reconstruction errors are optimized using the least squares method to obtain an optimization function:

$$\frac{1}{2}\sum_{i=1}^{m}\sum_{j=1}^{n}\|z_{ij} - h(\xi_i, p_j)\|^2$$

$z_{ij}$ represents data generated by observation of landmark $p_j$ at pose $\xi_i$.

Finally, the fused point cloud data is obtained.

The obtaining the rotation matrix R and translation vector t through sensors in S1 refers to obtaining position and orientation information of a data collection vehicle through integrated Inertial Navigation System (INS)/Global Navigation Satellite System (GNSS), calculating the rotation matrix R using INS, and performing correction and calibration using GNSS data to obtain the translation vector t. This results in the rotation matrix R and translation vector t with centimeter-level accuracy.

In S2, all the point cloud data are merged into a combined point cloud using the rotation matrix R and the translation vector t, to complete construction of a 4D road scene.

Specifically, the rotation matrix R and translation vector t corresponding to each frame form a 4×4 homogeneous transformation matrix:

[[$R_{11},R_{12},R_{13},t_1$],[$R_{21},R_{22},R_{23},t_2$],[$R_{31},R_{32},R_{33},t_3$],[0,0,0,1]]

Each frame of point cloud is multiplied by the corresponding homogeneous transformation matrix to obtain the transformed point cloud.

Figure 2:
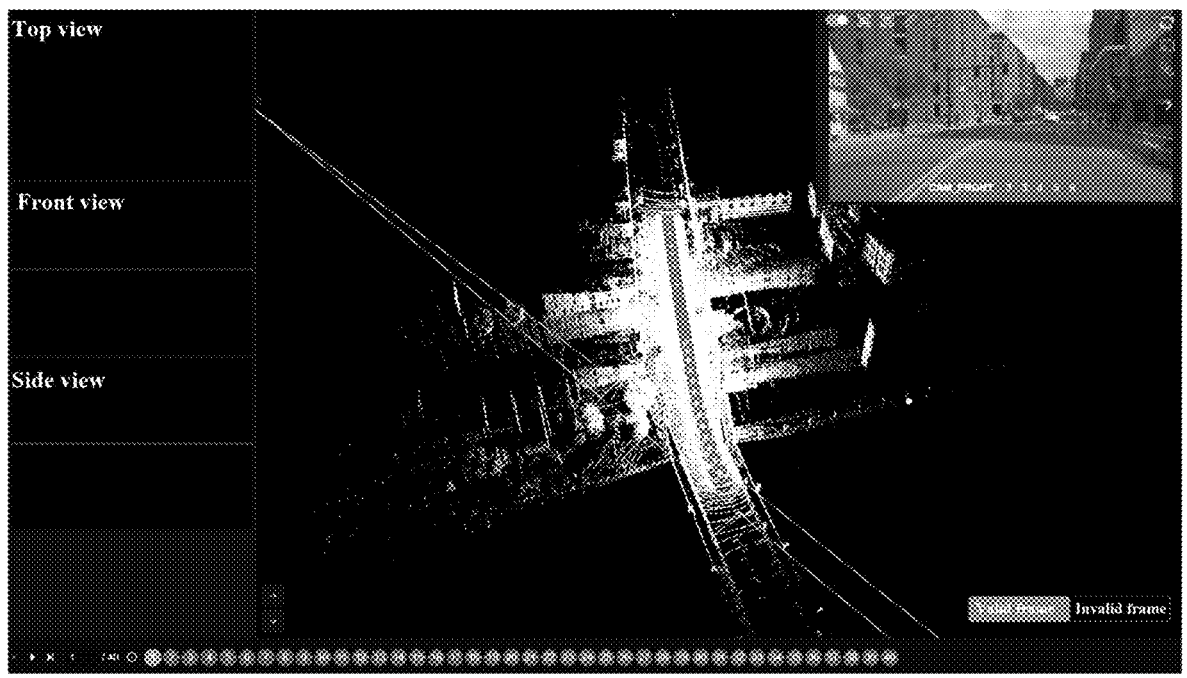
FIG. 2 illustrates a 4D scene effect according to an exemplary embodiment.

Finally, the transformed point clouds are concatenated in chronological order to obtain the final combined point cloud, completing the construction of the 4D road scene. The construction process of the 4D road scene is simple and efficient, capable of quickly processing a large amount of point cloud data, and the final reconstructed 4D scene is illustrated in FIG. 2.

In S3, dynamic and static object annotation and lane line annotation are performed on the combined point cloud in the 4D road scene, where the dynamic and static object annotation includes detecting objects in the 4D road scene using a 3D object detector to obtain a plurality of detection boxes, and optimizing generation of the detection boxes using bidirectional multi-object tracking; and the lane line annotation includes extracting ground information in the 4D road scene through normal vectors, extracting lane line point sets, and fitting lane line curves.

Specifically, the 3D object detector uses a deep learning model, which can accept 3D point cloud data as input and output possible object categories and confidence scores thereof for each point cloud region. After training, this model can automatically extract important features from the image and predict corresponding object category labels.

For each point cloud image, a series of detection results are obtained, including the position, size, shape, and object classification information of each target. To further visualize the results, multiple bounding boxes are usually drawn on the original point cloud image to represent the detected objects.

Finally, by continuously detecting and annotating a large number of scenes, a substantial amount of 3D data with object labels can be accumulated, which can be used to train a more powerful deep learning model or provided for relevant applications.

The bidirectional multi-object tracking may include the following processes:
(1) Forward tracking: A motion model and an object association algorithm are used to track feature points on object movement trajectories from near to far. Detection boxes are set for objects composed of the feature points, and all detection boxes on a same trajectory are associated with the same number.

Specifically, a 3D Kalman filter is employed as the motion model. A Kalman filter in three-dimensional space is defined as follows:

$$Z=[x,y,z,\theta,l,w,h,\dot{x},\dot{y},\dot{z}]$$

x, y, z represent a position of a detection box; θ represents a velocity of the detection box; l, w, h represent a size of the detection box; and $\dot{x}$, $\dot{y}$, $\dot{z}$ represent a direction of the detection box.

The object association algorithm associates objects through temporal intersection-over-union (TIoU), which is defined as average intersection over union (IoU) of each detection box pair divided by a union length of two trajectories, expressed as follows:

$$TIoU\left(G_a^{S_a}, G_b^{S_b}\right) = \frac{\sum_{i=1}^{|S_a \cap S_b|} IoU\left(B_a^i, B_b^i\right)}{|S_a \cup S_b|}$$

Sa and Sb are time step indicators of trajectories Ga and Gb, respectively; Bi represents an i-th grid of an overlapping part between the two trajectories.
(2) Backtracking: Motion states of tracked objects are estimated and a trajectory is extended to feature points on object movement trajectories from far to near. Detection boxes are set for objects composed of the feature points, and all detection boxes on a same trajectory are associated with a same number.

Specifically, the backtracking estimates the motion states of the tracked objects and extends a trajectory to feature points on the object movement trajectories in the x-axis direction from far to near. Detection boxes are set for objects composed of the feature points, and all detection boxes on the same trajectory are associated with the same number.

Figure 3:
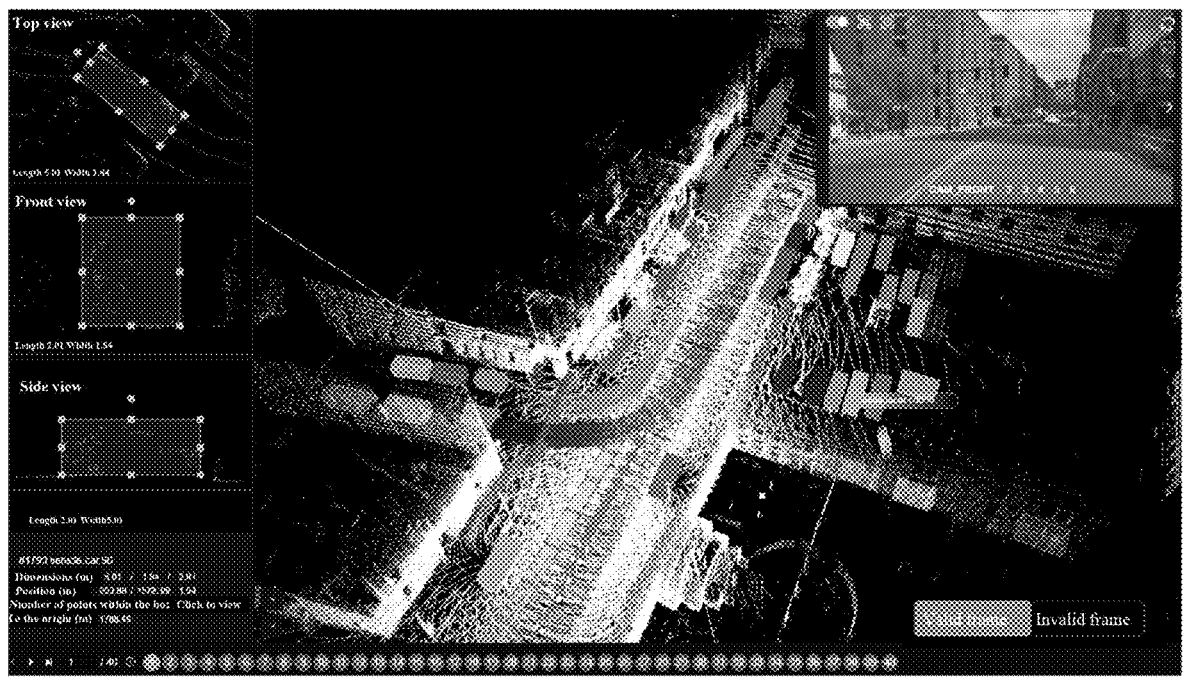
FIG. 3 illustrates an effect of generated dynamic and static object detection boxes according to an exemplary embodiment.

The final effect of the generated dynamic and static object detection boxes is shown in FIG. 3.

Said extracting the ground information in the 4D road scene through the normal vectors, extracting the lane line point sets, and fitting lane line curves can include the following sub-steps:

In B1, the ground information in the 4D road scene is extracted through the normal vectors to obtain ground points in the 4D road scene.

Specifically, coordinates (x,y,z) and rotation angles (r,p,y) or quaternions (x, y, z, w) of each frame form the pose of the frame, and a data collection device filters out point clouds with a fixed radius length as processing units based on the pose of each frame.

For each processing unit, a normal vector vertically upward in the coordinate system is set and a plane perpendicular to the normal vector is fitted as the ground in the processing unit. Finally, grounds of all the units are combined to obtain ground points in the 4D scene.

In B2, ground points with intensity within a predetermined range are clustered to obtain a plurality of ground lane line segment point sets.

Specifically, an intensity threshold is set to 20-100. Points within the range of the intensity threshold are selected as clustering sample points, and these sample points are inputted into a density-based clustering non-parametric algorithm (DBSCAN). This algorithm requires setting a neighborhood radius (eps) and the minimum number of points (MinPts) before clustering. In the eps neighborhood of an object, there are at least MinPts points. All density-reachable points in this region form a cluster, and density-reachable points in this cluster are continuously searched for until no new density-reachable points are found. Finally, multiple ground lane line segment point sets are obtained.

In B3, segment point sets on a same lane line are associated along an x-axis positive direction, and a fitting curve for the segment point sets on the same lane line is obtained using linear regression. The fitting curve is used as a final lane line.

Specifically, a lane line is structured data extending along the x-axis direction. A lane line segment point set with a minimum x value is selected as an initial lane line segment. Within this point set, a ray in the x-axis positive direction is created using points with maximum and minimum x values. For this ray, a point set closest to the ray is selected from all the lane line segment point sets. This point set is considered as part of the lane line to which the initial lane line segment belongs and added to the initial lane line segment. The process continues to find the next lane line segment belonging to the same lane line until no new lane line segment is added.

Figure 4:
FIG. 4 illustrates an effect of fitted lane lines according to an exemplary embodiment.

After all lane line point sets are associated, each set is separately inputted into the XGBoost algorithm to fit curves on the corresponding point sets, resulting in the final lane lines. This algorithm introduces a regularization term to effectively avoid overfitting, and supports parallel processing, which significantly improves the computational speed. The finally fitted lane lines are shown in FIG. 4.

In S4, annotation information in the 4D road scene is mapped to all the 2D image data at the time series based on camera parameter information, to obtain annotation information on 2D images. This step may include the following sub-steps:

In S41, point coordinates from a local coordinate system are transformed to a camera coordinate system through a camera extrinsic matrix, to obtain point coordinates in the camera coordinate system.

Specifically, the camera extrinsic matrix is obtained through calibration. Using sensor extrinsic parameters, data is transformed into a sensor coordinate system. For any point (x,y,z) in a global coordinate system, transformation to the sensor coordinate system through the camera extrinsic matrix is represented as follows:

$$\begin{bmatrix} x_s \\ y_s \\ z_s \end{bmatrix} = Rt_{global\ 2\ sensor} \begin{bmatrix} x \\ y \\ z \end{bmatrix}$$

$Rt_{global\ 2\ sensor}$ represents a homogeneous transformation matrix that transforms points from the global coordinate system to the sensor coordinate system.

The camera parameter information generally includes camera intrinsic data and camera extrinsic data. The camera intrinsic data generally includes focal length, optical center, pixel size, and radial and tangential distortion parameters. The camera extrinsic data generally includes a calibrated rotation matrix and translation vector.

In S42, points in the camera coordinate system are transformed to a pixel coordinate system using camera intrinsic parameters and distortion parameters, to obtain point coordinates in the pixel coordinate system, thus obtaining the annotation information on the 2D images.

Specifically, the camera intrinsic parameters are in a 3×3 matrix:

$$\begin{bmatrix} f_x & 0 & c_x \\ 0 & f_y & c_y \\ 0 & 0 & 0 \end{bmatrix}$$

The transformation of points to the pixel coordinate system using the sensor intrinsic parameters and distortion parameters is expressed as follows:

$$\begin{bmatrix} u \\ v \end{bmatrix} = \begin{bmatrix} f_x & 0 & c_x \\ 0 & f_y & c_y \end{bmatrix} \left( K_1 \begin{bmatrix} x_s/z_s \\ y_s/z_s \end{bmatrix} + K_2 \begin{bmatrix} (x_s/z_s)^2 + (y_s/z_s)^2 \\ 2x_s y_s/z_s \end{bmatrix} \right)$$

u and v are pixel coordinates after the transformation; $f_x$ and $f_y$ are camera focal lengths; $K_1$ and $K_2$ are camera distortion coefficients.

Figure 5:
FIG. 5 illustrates a mapping effect according to an exemplary embodiment.

The obtained results are inversely mapped back to all images at the time series. In other words, by annotating one 4D road scene, all images at the entire time series can be annotated. The mapping effect is shown in FIG. 5.

Corresponding to the foregoing embodiment of the method for 4D road scene annotation based on time series data, the present disclosure further provides an embodiment of an apparatus for 4D road scene construction and pre-annotation based on time series data.

Figure 6:
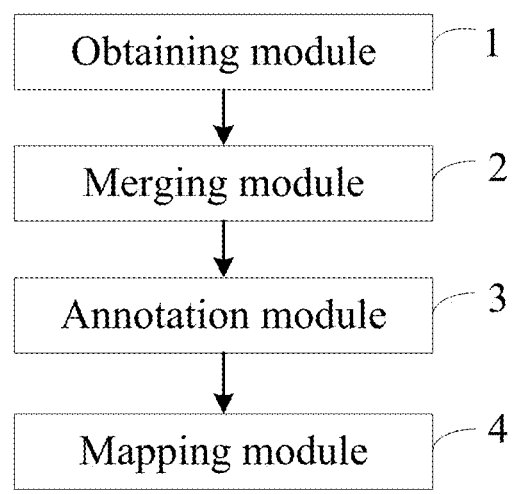
FIG. 6 is a block diagram of an apparatus for 4D road scene annotation based on time series data according to an exemplary embodiment.

FIG. 6 is a block diagram of an apparatus for 4D road scene construction and pre-annotation based on time series data according to an exemplary embodiment. Referring to FIG. 6, the apparatus includes an obtaining module, a merging module, an annotation module, and a mapping module.

The obtaining module is configured to obtain point cloud data and multi-view 2D image data of a same road scene at a same time series, as well as a rotation matrix R and a translation vector t obtained through sensors.

The merging module is configured to merge all the point cloud data into a combined point cloud using the rotation matrix R and the translation vector t, to complete construction of a 4D road scene.

The annotation module is configured to perform dynamic and static object annotation and lane line annotation on the combined point cloud in the 4D road scene. The dynamic and static object annotation includes detecting objects in the 4D road scene using a 3D object detector to obtain a plurality of detection boxes, and optimizing generation of the detection boxes using bidirectional multi-object tracking. The lane line annotation includes extracting ground information in the 4D road scene through normal vectors, extracting lane line point sets, and fitting lane line curves.

The mapping module I configured to map annotation information in the 4D road scene to all the 2D image data at the time series based on camera parameter information, to obtain annotation information on 2D images.

Figure 7:
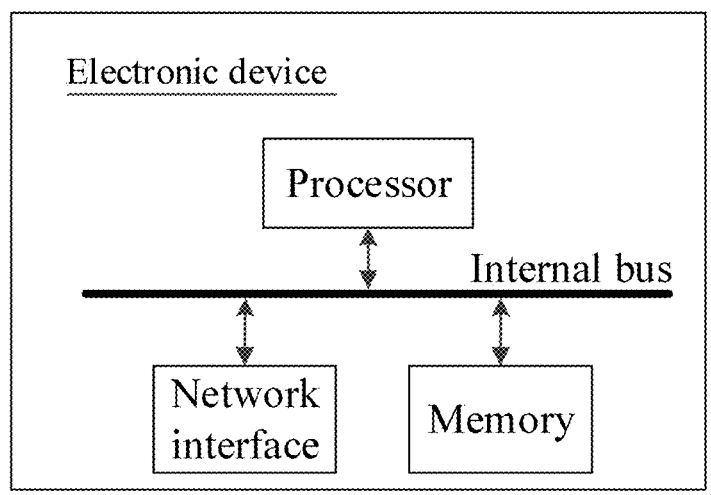
FIG. 7 is a block diagram of an electronic device according to an exemplary embodiment.

Correspondingly, the present disclosure further provides an electronic device, including one or more processors; and a memory for storing one or more programs. When executed by the one or more processors, the one or more programs cause the one or more processors to implement the above-mentioned method for 4D road scene annotation based on time series data. FIG. 7 is a hardware structure diagram of any device with data processing capabilities where the apparatus for 4D road scene annotation based on time series data according to an embodiment of the present disclosure is located. In addition to the processor and memory shown in FIG. 7, the device with data processing capabilities, in which the apparatus of the embodiment is located, may typically include other hardware based on the actual functionality of the device with data processing capabilities, and details are not described herein.

Correspondingly, the present disclosure further provides a computer-readable storage medium storing a computer instruction, where the instruction implements the above-mentioned method for 4D road scene annotation based on time series data when executed by a processor. The computer-readable storage medium may be an internal storage unit of the device with data processing capabilities described in any of the foregoing embodiments, such as a hard disk or an internal storage. The computer readable storage medium may alternatively be an external storage device of a computer, such as a plug-in hard disk, a smart media card (SMC), an SD card, or a flash card equipped on the device. Further, the computer-readable storage medium may alternatively include both an internal storage unit and an external storage device of the device with data processing capabilities. The computer readable storage medium is configured to store the computer program and other programs and data that are required by the device with data processing capabilities, or may further be configured to temporarily store data that has been output or to be output.

Those skilled in the art could easily conceive of other implementation solutions of the present disclosure upon consideration of the specification and the contents disclosed in the implementation. The present disclosure is intended to cover any variation, use, or adaptive change of the present disclosure. The variation, use, or adaptive change follows the general principles of the present disclosure and includes common knowledge or conventional technical means in the technical field that are not disclosed by the present disclosure. The specification and embodiments are merely considered as exemplary only, and the real scope and spirit of the present disclosure are pointed out by the appended claims.

It should be noted that, the present disclosure is not limited to the precise structures that have been described above and shown in the accompanying drawings, and can be modified and changed in many ways without departing from the scope of the present disclosure. The scope of the present disclosure is defined by the appended claims.

What is claimed is:

1. A method for four-dimensional (4D) road scene annotation based on time series data, comprising:
   obtaining point cloud data and multi-view two dimensional (2D) image data of a same road scene in a same time period, as well as a rotation matrix R and a translation vector t obtained through sensors;
   merging all the point cloud data into a combined point cloud using the rotation matrix R and the translation vector t, to complete construction of a 4D road scene;
   performing dynamic and static object annotation and lane line annotation on the combined point cloud in the 4D road scene, wherein the dynamic and static object annotation comprises detecting objects in the 4D road scene using a three-dimensional (3D) object detector to obtain a plurality of detection boxes, and optimizing generation of the detection boxes using a bidirectional multi-object tracking; and the lane line annotation comprises extracting ground information in the 4D road scene through normal vectors, then extracting lane line point sets, and finally fitting lane line curves; and
   mapping annotation information in the 4D road scene to all the 2D image data in the time period based on camera parameter information, to obtain annotation information on 2D images;
   the bidirectional multi-object tracking comprises:
   forward tracking: using a motion model and an object association algorithm to track feature points on an object movement trajectory from near to far, setting detection boxes for objects composed of the feature points, and associating all detection boxes on the same object movement trajectory with a same number; and
   backtracking: estimating motion states of tracked objects and extending a trajectory to feature points on object movement trajectories from far to near, setting detection boxes for objects composed of the feature points, and associating all detection boxes on a same trajectory with a same number.

2. The method according to claim 1, wherein said obtaining the point cloud data and the multi-view 2D image data of the same road scene in the same time period comprises:
   in the same road scene in the same time period, obtaining multi-view 2D image data captured by a camera and point cloud data captured by a radar; or
   in the same road scene in the same time period, obtaining multi-view 2D image data captured by a camera, and deducing 3D information from the image data of different angles to obtain the point cloud data.

3. The method according to claim 2, wherein said deducing the 3D information from the image data of different angles to obtain the point cloud data comprises:
   extracting feature points of the image data using Scale Invariant Feature Transform (SIFT) descriptors with scale and rotation invariance;
   performing matching calculations between feature points of the image data pair-wise to obtain a rotation matrix R' and a translation vector t'; and
   according to the rotation matrix R', translation vector t', and camera intrinsic parameters, reconstructing sparse point cloud structures of objects, transforming each sparse point cloud structure into a common reference for point cloud fusion, to obtain the point cloud data.

4. The method according to claim 1, wherein said extracting the ground information in the 4D road scene through the normal vectors, then extracting the lane line point sets, and finally fitting the lane line curves comprises the following sub-steps:
   extracting the ground information in the 4D road scene through the normal vectors to obtain ground points in the 4D road scene;
   clustering ground points with intensity within a predetermined range to obtain a plurality of ground lane line segment point sets;

associating segment point sets on a same lane line along an x-axis positive direction, and obtaining a fitting curve for the segment point sets on the same lane line using linear regression, wherein the fitting curve is used as a final lane line.

5. The method according to claim 1, wherein said mapping the annotation information of the point cloud data to all the 2D image data in the time period based on the camera parameter information to obtain the annotation information on the 2D images comprises:

transforming coordinates of any given point in the 4D road scene to a camera coordinate system through a camera extrinsic matrix, to obtain point coordinates in the camera coordinate system; and transforming points in the camera coordinate system to a pixel coordinate system using camera intrinsic parameters and distortion parameters, to obtain point coordinates in the pixel coordinate system, thus obtaining the annotation information on the 2D images.

6. The method according to claim 1, wherein the camera parameter information comprises:

camera intrinsic data, comprising focal length, optical center, pixel size, and radial and tangential distortion parameters; and camera extrinsic data, comprising a rotation matrix and translation vector.

7. An electronic device, comprising:

one or more processors; and a memory, used for storing one or more programs; wherein the one or more processors implement the method according to claim 1 when executing the one or more programs.

8. A non-transitory computer-readable storage medium having instructions stored thereon that when executed on a processor, cause the processor to implement steps of the method according to claim 1.

* * * * *